United States Patent [19]
Shelton

[11] 4,226,377
[45] Oct. 7, 1980

[54] GLASS BREAKING MACHINE

[76] Inventor: Harold E. Shelton, 1820 - 53rd St., Albany, Oreg. 97321

[21] Appl. No.: 958,210

[22] Filed: Nov. 6, 1978

[51] Int. Cl.³ .................... B02C 13/04; B02C 13/286
[52] U.S. Cl. .................................. 241/99; 241/186.3; 241/189 R; 241/194; 241/285 R
[58] Field of Search .................. 241/99, 186 R, 186.3, 241/189 R, 189 A, 194, 28 R; 141/105, 284, 333, 334

[56] References Cited

U.S. PATENT DOCUMENTS

| | | | |
|---|---|---|---|
| 2,705,597 | 4/1955 | Erickson | 241/186 UX |
| 2,800,159 | 7/1957 | Walsh et al. | 241/99 X |
| 3,208,485 | 9/1965 | Tiffany | 141/284 X |
| 3,322,355 | 5/1967 | Bryant | 241/99 X |
| 3,482,788 | 12/1969 | Newell | 241/194 X |
| 3,899,886 | 6/1975 | Spivey | 241/99 X |
| 3,927,703 | 12/1975 | Beaubien | 141/333 |

*Primary Examiner*—Howard N. Goldberg
*Attorney, Agent, or Firm*—James D. Givnan, Jr.

[57] ABSTRACT

A glass breaking machine having a hammer mill removably mounted within the machine. The hammer mill includes multiple series of hammers each following an orbital pattern offset from the remaining hammers. A hammer mill housing opening enables hammer mill removal for service purposes. Similarly, each hammer is readily detachable from the hammer mill. A chute is swingably mounted to enable classifying of the fractured material according to color or other criteria.

4 Claims, 4 Drawing Figures

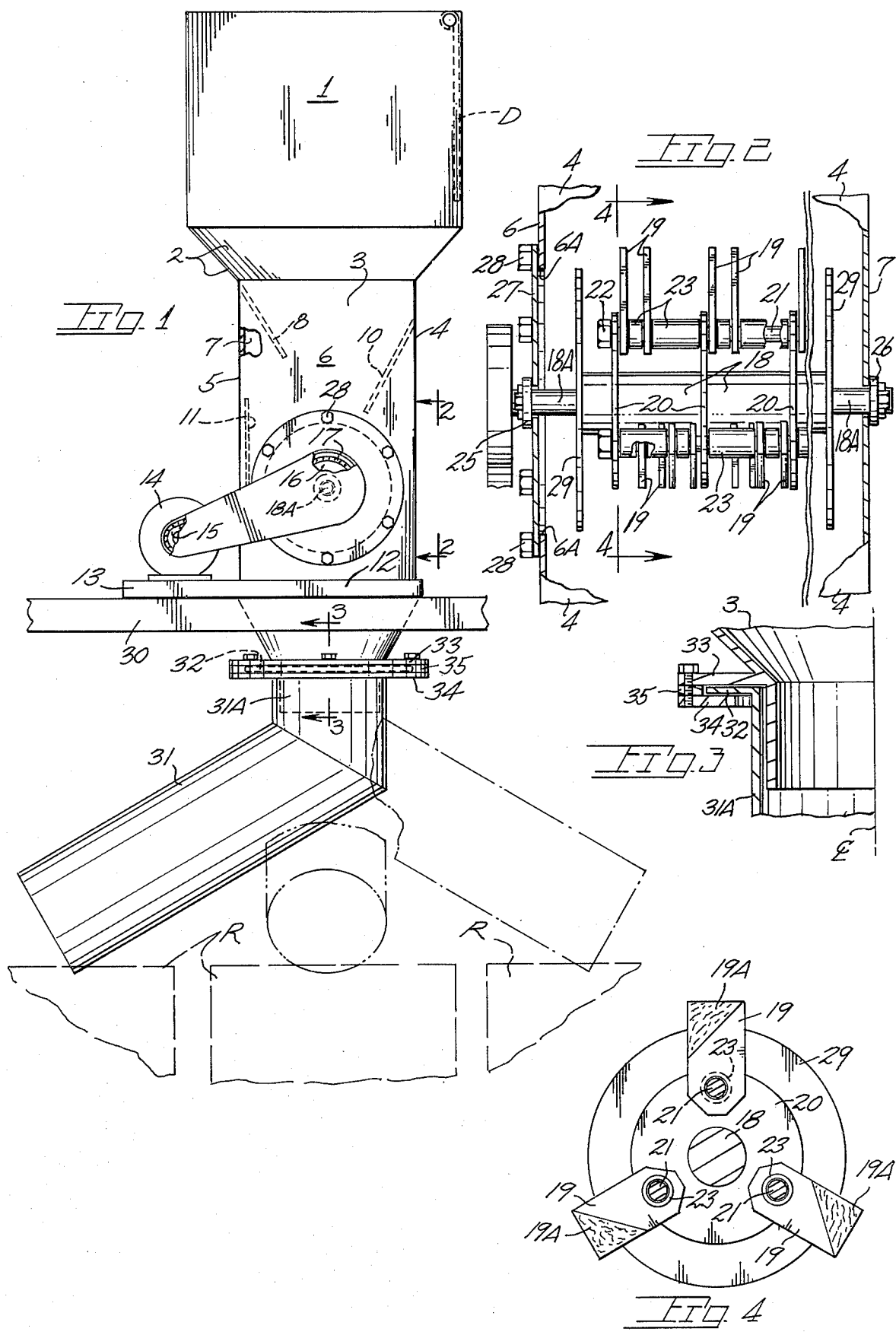

GLASS BREAKING MACHINE

BACKGROUND OF THE INVENTION

The present invention concerns a machine for pulverizing used glass and separation thereof into two or move receptacles.

In certain industries, alcoholic beverages for example, certain state laws compel the destruction of the bottle to prevent unauthorized re-use. In small establishments it has heretofore been necessary for an employee to physically break emptied bottles. Only in very large establishments has a mechanized bottle breaker been practical. The task of manually breaking bottles is both time consuming and, to some degree, dangerous.

When particulate glass is sold to a reclaiming operation, the per pound price paid to the establishment owner for glass sorted by color is higher than that paid for glass fragments of mixed colors. Further, compact storage of broken, sorted glass is highly desirable.

SUMMARY OF THE PRESENT INVENTION

The present invention is embodied within a glass breaking machine having a highly efficient hammer mill which rapidly crushes bottles at a high rate and enables glass discharge into two or more receptacles.

The bottle breaking machine includes a bin into which bottles are discharged for delivery to a hammer mill of a design particularly intended for efficient glass breaking. Staggered hammers are detachably mounted for replacement purposes after long periods of operation. As pulverized glass is highly abrasive, it is desirable that the hammers and hammer mill housing be provided with hard facing material and also include the provision of being replaceable in a rapid and convenient manner at the using location by relatively unskilled help. Of importance is the additional capability of the present machine to discharge the glass particles into two or more receptacles as determined by the position of a swingable discharge chute.

Important objectives of the present glass breaking machine include the provision of a hammer mill within the machine which includes swingably mounted hammers axially offset or staggered from adjacent hammers to effect thorough breaking of the glass into small fragments for compact storage and shipping; the provision of a glass breaking machine with a hammer mill readily removable from the machine for servicing purposes; the provision of a glass breaking machine enabling the operator to conveniently segregate glass particles by repositioning of a discharge chute.

BRIEF DESCRIPTION OF THE DRAWING

In the accompanying drawing:

FIG. 1 is a side elevational view of the present glass breaking machine;

FIG. 2 is a vertical sectional view taken along line 2—2 of FIG. 1 with a housing wall broken away;

FIG. 3 is a vertical sectional view taken along line 3—3 of FIG. 1; and

FIG. 4 is a vertical sectional view taken along line 4—4 of FIG. 2.

DETAILED DESCRIPTION OF THE PREFERRED EMBODIMENT

With continuing attention to the accompanying drawing, the reference numeral 1 indicates a bottle bin into which bottles and other glass products are discharged. The bin is of closed, box-like configuration having downwardly converging lower walls as at 2 which terminate in securement with the upper edges of a hammer mill housing 3. A door D closes the bin.

The hammer mill housing is of welded plate construction having front and rear walls 4 and 5 with side walls at 6 and 7. Disposed adjacent the upper end of said housing are cooperating plates 8 and 10 which converge in a downward direction for desired discharge of the bottles (or other glass articles) to the later described hammer mill. Secured to the inner surface of rear wall 5 is a wear plate 11 of high grade steel. A housing frame at 12 serves to reinforce the wall members of the housing and additionally extends outwardly to provide a motor mount 13 on which an electric motor 14 is mounted. A motor sprocket 15 drives a hamme mill sprocket 16 by means of a roller chain 17.

With particular attention now to the hammer mill, the same includes a main shaft 18 to which are secured, in an evenly and widely spaced manner, plates 20 with each apertured to receive a hammer carrying rod 21 with the rod ends being locked to the outer end located plates 20 by suitable locking nuts at 22. Disposed on each rod 21 are spacer collars 23 of various lengths. As shown in FIG. 4, each rod 21 has its hammer at 19 swingably mounted thereon with the hammers on one rod traveling an orbital path offset from the hammers associated with a remaining rod. Such offsetting is accomplished by the collars 23 being of different lengths. Disassembling of a hammer mill is readily accomplished by removal of fasteners 22 which permits extraction of the hammer supporting rods for hammer servicing or replacement. Such is accomplished upon hammer mill detachment from the machine.

Walls 6 and 7 of the hammer mill housing support bearings 25 and 26 with bearing 25 being affixed to a closure plate 27 secured to housing wall by fasteners 28. Said closure plate is concentric with an opening 6A in the housing wall which is of a size permitting outward axial passage of the hammer mill for periodic refurbishment upon cover plate removal. With attention to FIG. 2, it is to be noted that the hammers are shown in their dynamic, radially extended position which, of course, is not their position when the hammer mill is static in which instance the hammers are in a pendulous state, easily removed through opening 6A. Hammer mill shaft 18 has reduced ends 18A one of which is fitted with the driven sprocket 16 while the remaining shaft end is slip fitted within bearing 26. Circular end plates at 29 confine flying glass particles to protect bearings 25-26 with each plate having apertures aligned with the hammer carrying rods 21 enabling axial passage therepast during assembly and disassembly operations.

A machine support structure or base is indicated at 30 and may include ground engaging legs (not shown).

A discharge chute 31 includes an upright segment 31A which terminates upwardly and thereat is provided with a flange 32 rotatably mounted intermediate upper and lower chute mounting plates 33 and 34 spaced by a spacer ring 35. Parametrically spaced fasteners extend through the mounting plates and spacer 35 to support flange 32 of the chute for rotational movement about the upright axis of chute portion 31A. Accordingly, chute 31 may be swingably positioned for the discharge of broken glass into two or more receptacles R for separation of the glass by color or other selected criteria.

In use, the glass or other material to be fractured is discharged into bin 1 and door D closed. The bottles, glass, etc., gravities as guided by plates 8 and 10 into the hammer mill with each of the swingably mounted hammers 19 forcefully contacting the material which is supported against movement by wear plate 11. The offset hammers rapidly reduce the material to ground particulate of a size stored and shipped in a compact manner.

Chute 31 is manually positionable by the operator for discharge of glass particles into the appropriate receptacle R.

After a lengthy period of operation, normally several months, it may be necessary to re-surface with hard facing at 19A or replace one or more of the hammers 19 in which case the hammer mill is readily laterally extractible from the machine upon removal of cover plate 27, whereafter hammer mill shaft 18 may be slidably disengaged from the housing attached bearing 26. Disassembly of the hammer mill and its components on a periodic basis is accomplished by removal of fasteners 22 from the rod ends whereupon the rods may be extracted. Upon replacement or re-surfacing of the hammers with carbide, the hammer mill is reassembled and reinstalled within the hammer mill housing. The foregoing servicing operation is simple and may be performed by relatively unskilled labor to avoid the costly shipment of the machine to a repair site or, alternatively, the costly servicing of same by a highly skilled repairman.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A glass breaking machine for sorting different colored glass and comprising, a bin for reception of glass to be broken, a hammer mill housing below said bin, a hammer mill disposed below said bin and journalled within said hammer mill housing, said hammer mill including multiple series of hammers with each series radially spaced from the hammer mill axis of rotation, said hammer mill including a main shaft, said hammer mill housing defining an opening of a size permitting outward axial passage of the hammer mill for servicing purposes, a closure plate removably affixed to the hammer mill housing and normally closing said opening, and bearing means on said closure plate for the hammer mill main shaft, additional bearing means on said hammer mill housing opposite the first mentioned bearing means with the bearing means jointly supporting said main shaft, a discharge chute, and means swingably coupling said chute to the housing lower end whereby said chute may be manually arcuately positioned for the discharge of broken glass into one of several receptacles each containing glass of one color.

2. The machine claimed in claim 1 wherein said additional bearing means on the hammer mill housing is adapted for sliding reception of the hammer mill main shaft.

3. The machine claimed in claim 1 wherein said hammer mill comprises plates secured to said main shaft at widely spaced intervals therealong, hammer support rods removably mounted on said plates, each series of hammers carried by a support rod, spacer collars of different lengths removably mounted on said support rods to effect desired lateral spacing of said hammers.

4. The machine claimed in claim 3 further including end plates on said main shaft located proximate the shaft ends to protect the shaft supporting bearing means from glass particles.

* * * * *